(12) United States Patent
Hoyle et al.

(10) Patent No.: US 7,673,120 B2
(45) Date of Patent: Mar. 2, 2010

(54) INTER-CLUSTER COMMUNICATION NETWORK AND HEIRARCHICAL REGISTER FILES FOR CLUSTERED VLIW PROCESSORS

(75) Inventors: David J. Hoyle, Sugarland, TX (US); Amitabh Menon, Lewisville, TX (US)

(73) Assignee: Texas Instruments Incorporated, Dallas, TX (US)

( * ) Notice: Subject to any disclaimer, the term of this patent is extended or adjusted under 35 U.S.C. 154(b) by 349 days.

(21) Appl. No.: 11/769,212

(22) Filed: Jun. 27, 2007

(65) Prior Publication Data
US 2009/0006816 A1 Jan. 1, 2009

(51) Int. Cl.
*G06F 9/40* (2006.01)
(52) U.S. Cl. ...................................... 712/218
(58) Field of Classification Search ............. None
See application file for complete search history.

(56) References Cited
U.S. PATENT DOCUMENTS

| | | | | |
|---|---|---|---|---|
| 4,663,706 A | * | 5/1987 | Allen et al. ............ 709/234 |
| 5,870,619 A | * | 2/1999 | Wilkinson et al. ......... 712/20 |
| 6,381,690 B1 | * | 4/2002 | Lee ........................... 712/223 |
| 6,842,850 B2 | * | 1/2005 | Ganapathy et al. .......... 712/221 |
| 7,236,106 B2 | * | 6/2007 | Wilson ........................ 341/50 |
| 7,424,597 B2 | * | 9/2008 | Lee et al. .................... 712/210 |
| 2002/0027552 A1 | * | 3/2002 | Lee ............................. 345/421 |
| 2003/0088754 A1 | * | 5/2003 | Barry et al. ................. 712/11 |
| 2005/0204118 A1 | * | 9/2005 | Jen et al. ..................... 712/225 |

* cited by examiner

*Primary Examiner*—Eric Coleman
(74) *Attorney, Agent, or Firm*—Robert D. Marshall, Jr.; Wade J. Brady, III; Frederick J. Telecky, Jr.

(57) ABSTRACT

A VLIW processor has a hierarchy of functional unit clusters that communicate through explicit control in the instruction stream and store data in register files at each level of the hierarchy. Explicit instructions transfer values between sub-clusters through a cluster level switch network. Transfer instructions issue in dedicated instruction issue slots in parallel with instructions that perform computation in functional units. The switch network can perform permutations on the data being moved. The switch network enables for operands to be broadcast between the sub-clusters, global register file and memory.

6 Claims, 6 Drawing Sheets

TO FIG. 1B

INTER-CLUSTER COMMUNICATION NETWORK AND HEIRARCHICAL REGISTER FILES FOR CLUSTERED VLIW PROCESSORS

TECHNICAL FIELD OF THE INVENTION

The technical field of this invention is communications in multiprocessors.

BACKGROUND OF THE INVENTION

Very long instruction word (VLIW) processor datapaths have traditionally depended on a large centralized register file to store variables for all functional units for the machine. This is not scalable as the issue width of the machine grows. The Texas Instruments C6000 family of digital signal processors tackled this problem by partitioning the datapath into 2 clusters. An implicit cross-cluster path connection used implicitly when a functional unit from a cluster sourced/wrote an operand from the register file of the other cluster provided inter-cluster communication. This does not scale well to higher number of clusters used to achieve even wider issue width. Transferring data between a large number of clusters of functional units is limited by the interconnect delays in deep submicron silicon processes. Implicit operand transfer with short latency functional unit operation impedes performance for a large number of functional unit clusters. Thus there is a problem in the art concerning inter-cluster communication and register file structure in wide issue VLIW processors.

SUMMARY OF THE INVENTION

This invention is a VLIW processor having a hierarchy of functional unit clusters that communicate through explicit control in the instruction stream and store data in register files at each level of the hierarchy. The combination of the hierarchical register files, explicitly controlled switch interconnect between sub-clusters and data permute capability in the switch network provides communication in a clustered VLIW processor.

This invention uses explicit instructions to transfer values between sub-clusters through a cluster level switch network. This does not inhibit performance because these transfer instructions issue in dedicated instruction issue slots in parallel to instructions that perform computation in functional units. The switch network allows some permutations to be performed on the data being moved. This differs from other solutions that require permutations to be done in functional units. The switch network allows for operands to be broadcast between the sub-clusters, global register file and memory.

BRIEF DESCRIPTION OF THE DRAWINGS

These and other aspects of this invention are illustrated in the drawings, in which.

DETAILED DESCRIPTION OF PREFERRED EMBODIMENTS

Figure 1A:
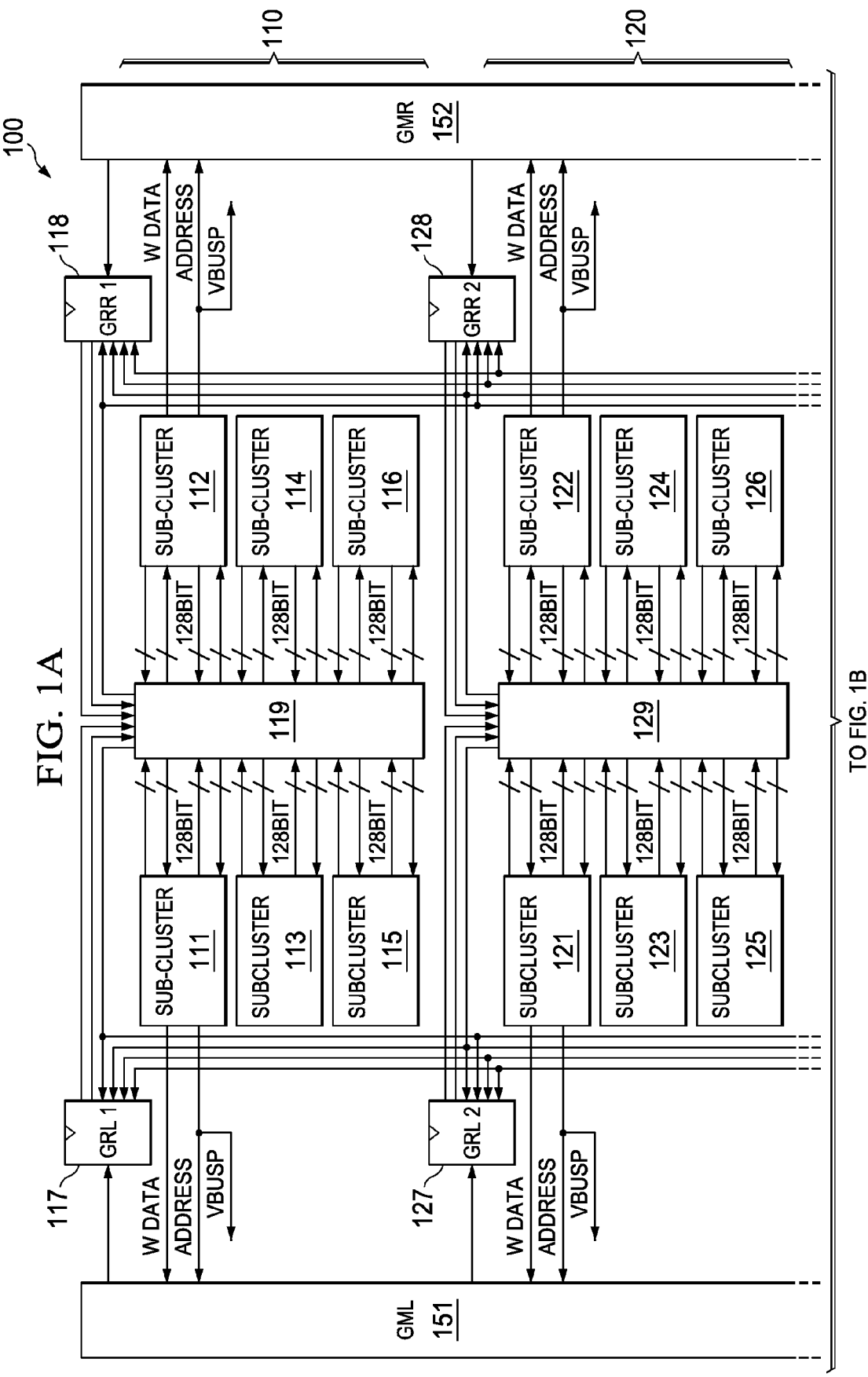
FIGS. 1A and 1B together illustrate the organization of the data processor of the preferred embodiment of this invention.
Figure 1B:
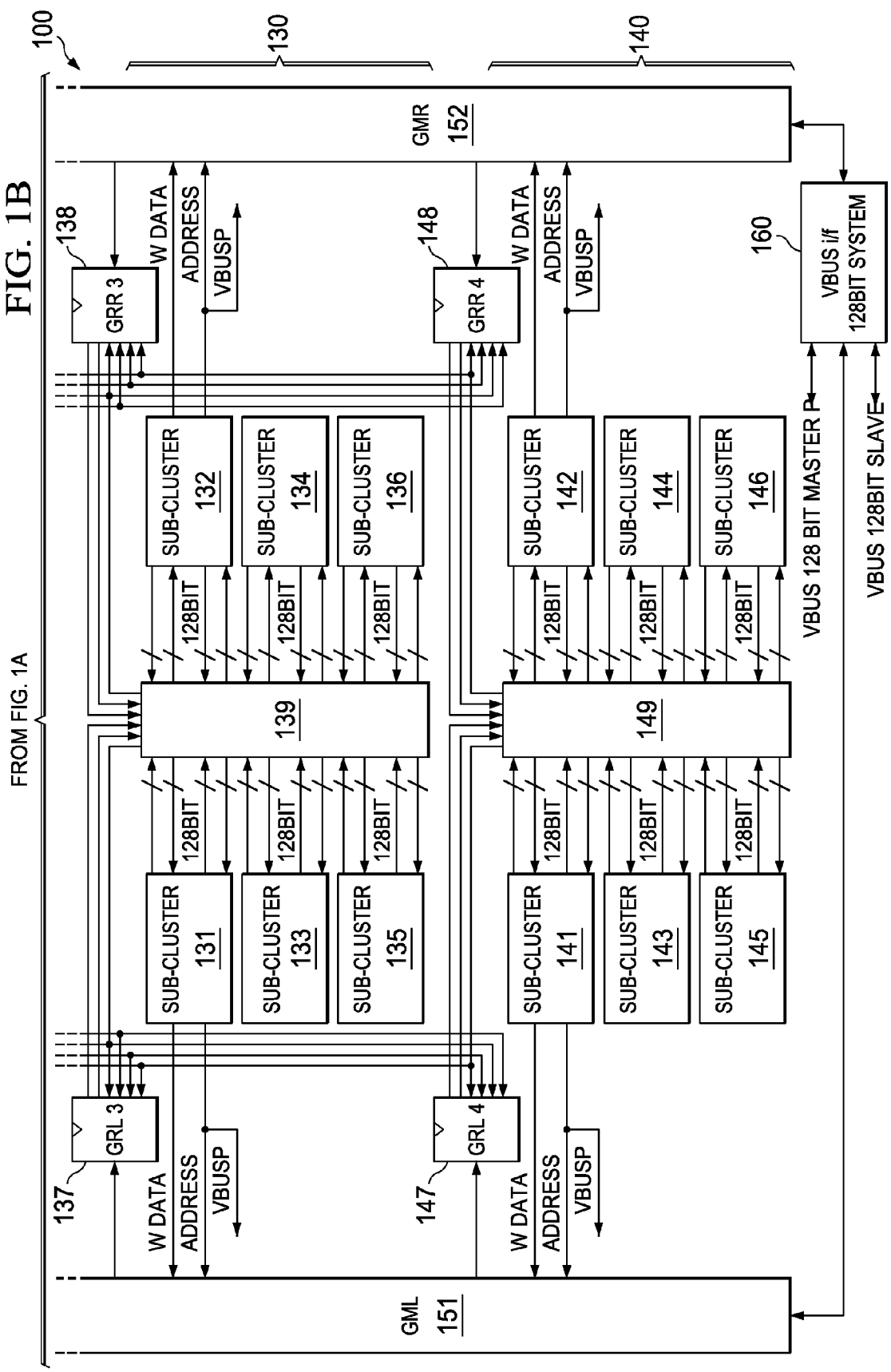

FIGS. 1A and 1B together illustrate a general block diagram of the data processor of this invention. Data processor 100 includes four data processing clusters 110, 120, 130 and 140. Each cluster includes six sub-clusters. Cluster 110 includes left sub-clusters 111, 113 and 115, and right sub-clusters 112, 114 and 116. The sub-clusters of cluster 110 communicate with other sub-clusters via transport switch 119. Besides connections to the sub-clusters, transport switch 119 also connects to global registers left 117 and global registers right 118. Global registers left 117 communicates with global memory left 151. Global registers right 118 communicates with global memory right 152. Global memory left 151 and global memory right 152 communicate with external devices via Vbus interface 160. Clusters 120, 130 and 140 are similarly constituted.

Each sub-cluster 111, 112, 113, 114, 115, 116, 121, 122, 123, 124, 125, 126, 131, 132, 133, 134, 135, 136, 141, 142, 143, 144, 145 and 146 includes main and secondary functional units, a local register file and a predicate register file. Sub-clusters 111, 112, 121, 122, 131, 132, 141 and 142 are called data store sub-clusters. These sub-clusters include main functional units having arithmetic logic units and memory load/store hardware directly connected to either global memory left 151 or global memory right 152. Each of these main functional units is also directly connected to Vbus interface 160. In these sub-clusters the secondary functional units are arithmetic logic units. Sub-clusters 112, 114, 122, 124, 132, 134, 142 and 144 are called math A sub-clusters. In these sub-clusters both the main and secondary functional units are arithmetic logic units. Sub-clusters 113, 116, 123, 126, 133, 136, 143 and 146 are called math M sub-clusters. The main functional units in these sub-clusters are multiply units and corresponding multiply type hardware. The secondary functional units of these sub-clusters are arithmetic logic units. Table 1 summarizes this disposition of functional units.

TABLE 1

| Sub-cluster Type | Main Functional Unit | Secondary Functional Unit |
| --- | --- | --- |
| Data | Load/store and ALU | ALU |
| Math A | ALU | ALU |
| Math M | Multiply | ALU |

Data processor 100 generally operates on 64-bit data words. The instruction set allows single instruction multiple data (SIMD) processing at the 64-bit level. Thus 64-bit SIMD instructions can perform 2 32-bit operations, 4 16-bit operations or 8 8-bit operations. Data processor 100 may optionally operate on 128-bit data words including corresponding SIMD instructions.

Each cluster 110, 120, 130 and 140 is separated into left and right regions. The left region is serviced by the data left sub-cluster 111, 121, 131 or 141. The right region is serviced by data right sub-cluster 112, 122, 132 or 142. These are connected to the global memory system. Any memory bank conflicts are resolved in the load/store pipeline.

Each cluster 110, 120, 130 and 140 includes its own local memory. These can be used for holding constants for filters or some kind of ongoing table such as that used in turbo decode. This local memory is not cached and there is no bank conflict resolution. These small local memories have a shorter latency than the main global memory interfaces.

Figure 2:
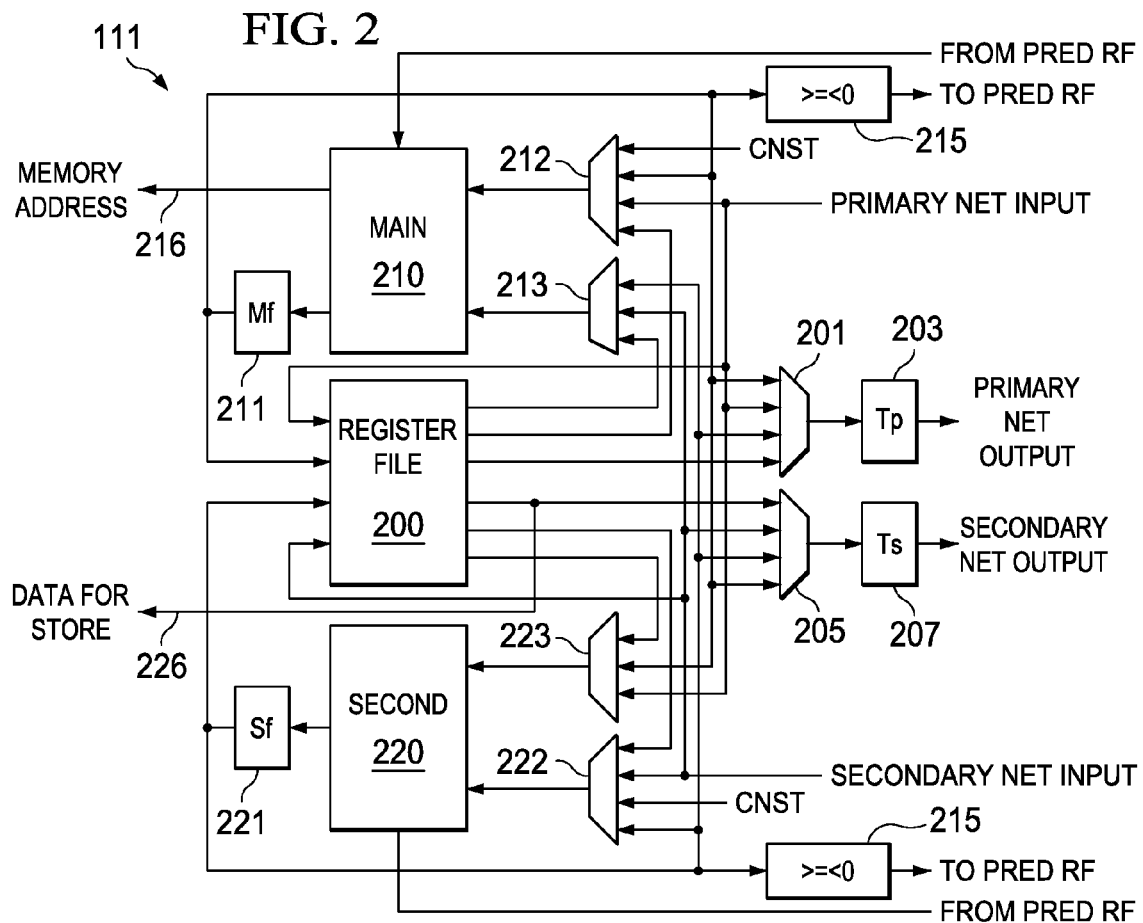
FIG. 2 illustrates a representative sub-cluster of the data processor of FIG. 1.

FIG. 2 illustrates a simplified block diagram of the hardware of data left sub-cluster 111 as a representative sub-cluster. FIG. 2 includes register file 200 with 6 read ports and 4 write ports, and functional units M 210 and S 220. Register file 200 in each sub-cluster includes 24 64-bit registers. These registers can also be accessed as register pairs for a total of 128-bits. The data path width of the functional units is 128 bits allowing maximum computational bandwidth using register pairs.

Main functional unit 210 includes one output to forwarding register Mf 211 and two operand inputs driven by respective multiplexers 212 and 213. Main functional unit 210 of representative sub-cluster 111 is preferably a memory address calculation unit having an additional memory address output 216. Functional unit 210 receives an input from an instruction designated predicate register to control whether the instruction results abort. The result of the computation of main functional unit 210 is always stored in forwarding register Mf 210 during the buffer operation (further explained below). During the next pipeline phase forwarding register Mf 210 supplies its data to one or more of: an write port register file 200; first input multiplexer 212; comparison unit 215; primary net output multiplexer 201; secondary net output multiplexer 205; and input multiplexer 223 of secondary functional unit 220. The destination or destinations of data stored in forwarding register Mf 211 depends upon the instruction.

First input multiplexer 212 selects one of four inputs for the first operand src1 of main functional unit 210 depending on the instruction. A first input is instruction specified constant cnst. As described above in conjunction with the instruction coding illustrated in FIGS. 5 and 6, the second and third operand fields of the instruction can specify a 5-bit constant. This 5-bit instruction specified constant may be zero filled or sign filled to the 64-bit operand width. A second input is the contents of forwarding register Mf 211. A third input is data from the primary net input. The use of this input will be further described below. A fourth input is from an instruction specified register in register file 200 via one of the 6 read ports.

Second input multiplexer 213 selects one of three inputs for the second operand src2 of main functional unit 210 depending on the instruction. A first input is the contents of forwarding register Sf 221 connected to secondary functional unit 220. A second input is data from the secondary net input. The use of this input will be further described below. A third input is from an instruction specified register in register file 200 via one of the 6 read ports.

Secondary functional unit 220 includes one output to forwarding register Sf 221 and two operand inputs driven by respective multiplexers 222 and 223. Secondary functional unit 220 is similarly connected as main functional unit 210. Functional unit 220 receives an input from an instruction designated predicate register to control whether the instruction results aborts. The result of the computation of secondary functional unit 220 is always stored in forwarding register Sf 221 during the buffer operation. Forwarding register Sf 221 supplies its data to one or more of: a write port register file 200; first input multiplexer 222; comparison unit 225; primary net output multiplexer 201; secondary net output multiplexer 205; and input multiplexer 213 of main functional unit 210. The destination or destinations of data stored in forwarding register Sf 221 depends upon the instruction.

First input multiplexer 222 selects one of four inputs for the first operand src1 of main functional unit 210 depending on the instruction: the instruction specified constant cnst; forwarding register Sf 221; secondary net input; and an instruction specified register in register file 200 via one of the 6 read ports. Second input multiplexer 213 selects one of three inputs for the second operand src2 of secondary functional unit 220 depending on the instruction: forwarding register Mf 211 of main functional unit 210; primary net input; and an instruction specified register in register file 200 via one of the 6 read ports.

FIG. 2 illustrates connections between representative sub-cluster 111 and the corresponding transport switch 119. Multiplexer 212 can select data from the primary net input for the first operand of main functional unit 210. Similarly multiplexer 223 can select data from the primary net input for the second operand of secondary functional unit 220. Multiplexer 213 can select data from the secondary net input for the second operand of main functional unit 210. Similarly multiplexer 222 can select data from the secondary net input for the first operand of secondary functional unit 220.

Representative sub-cluster 111 can supply data to the primary network and the secondary network. Primary output multiplexer 201 selects the data supplied to primary transport register 203. A first input is from forwarding register Mf 211. A second input is from the primary net input. A third input is from forwarding register 221. A fourth input is from register file 200. Secondary output multiplexer 205 selects the data supplied to secondary transport register 207. A first input is from register file 200. A second input is from the secondary net input. A third input is from forwarding register 221. A fourth input is from forwarding register Mf 211.

Figure 3:
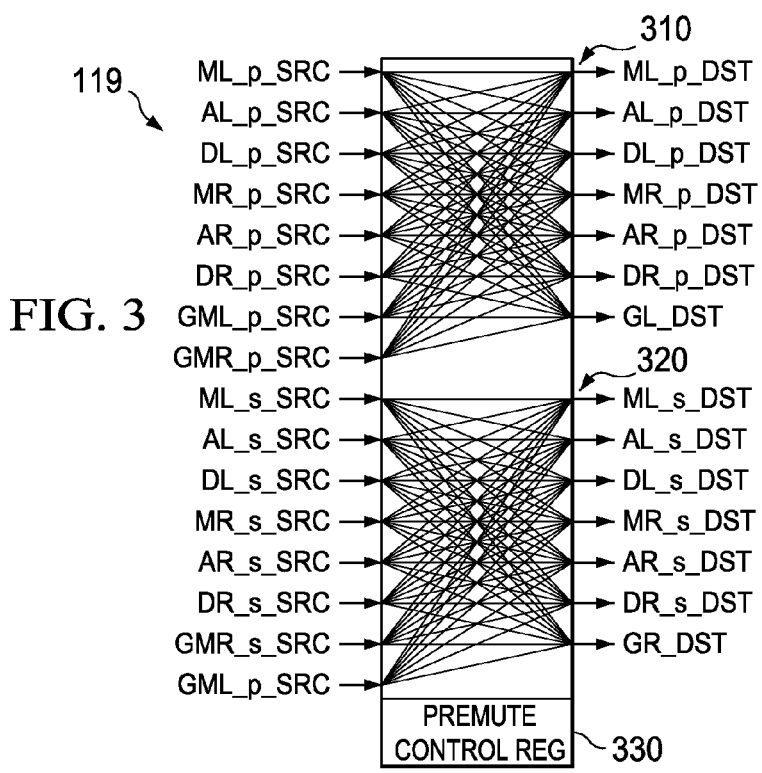
FIG. 3 illustrates the connectivity of a representative transport switch of the data processor of FIG. 1.

Sub-cluster 111 can separately send or receive primary net data or secondary net data via corresponding transport switch 119. FIG. 3 schematically illustrates the operation of transport switch 119. Transport switches 129, 139 and 149 operate similarly. Transport switch 119 has no storage elements and is purely a way to move data from one sub-cluster register file to another. Transport switch 119 includes two networks, primary network 310 and secondary network 320. Each of these networks is a set of seven 8-to-1 multiplexers. This is shown schematically in FIG. 3. Each multiplexer selects only a single input for supply to its output. Scheduling constraints in the complier will enforce this limitation. Each multiplexer in primary network 310 receives inputs from the primary network outputs of: math M left functional unit; math A left functional unit; data left functional unit; math M right functional unit; math A right functional unit; data right functional unit; global register left; and global register right. The seven multiplexers of primary network 310 supply data to the primary network inputs of: math M left functional unit; math A left functional unit; data left functional unit; math M right functional unit; math A right functional unit; data right functional unit; and global register left. Each multiplexer in primary network 320 receives inputs from the secondary network outputs of: math M left functional unit; math A left functional unit; data left functional unit; math M right functional unit; math A right functional unit; data right functional unit; global register left; and global register right. The seven multiplexers of secondary network 320 supply data to the secondary network inputs of: math M left functional unit; math A left functional unit; data left functional unit; math M right functional unit; math A right functional unit; data right functional unit; and global register right. Note that only primary network 310 can communicate to the global register left and only secondary network 320 communicates with global register right.

The data movement across transport switch 119 is via special move instructions. These move instructions specify a local register destination and a distant register source. Each sub-cluster can communicate with the register file of any other sub-cluster within the same cluster. Moves between sub-clusters of differing clusters require two stages. The first stage is a write to either left global register or to right global register. The second stage is a transfer from the global register to the destination sub-cluster. The global register files are actually duplicated per cluster. As show below, only global register moves can write to the global clusters. It is the programmer's responsibility to keep data coherent between clusters if this is necessary. Table 2 shows the type of such move instructions in the preferred embodiment.

TABLE 2

| Instruction | Operation |
|---|---|
| MVD | Transfer 64-bit data register through transport switch sub-cluster to sub-cluster or global register to sub-cluster |
| MVQ | Transfer 128-bit register pair through transport switch sub-cluster to sub-cluster or global register to sub-cluster |
| MVQD | Extract 64 bits from 128-bit register pair and transfer sub-cluster to sub-cluster or global register to sub-cluster |
| MVPQ | Transfer 128 bits of the predicate register file through crossbar sub-cluster to sub-cluster |
| MVPD | Transfer 16-bit value from 1 predicate register file to a 64-bit data register |
| MVDP | Transfer 16-bit value from a 64-bit data register file to a 16-bit predicate register |
| MVP | Transfer a specific predicate register into the move network sub-cluster to sub-cluster or global register file to sub-cluster, zero extend the upper 48 bits of the register |
| GMVD | Transfer 64-bit register from a sub-cluster to the global register file |
| GMVQ | Transfer 128-bit register pair from a sub-cluster to the global register file |
| GMVQD | Extract 64-bits from 128 bit register pair and transfer sub-cluster to global register file |

Figure 4:
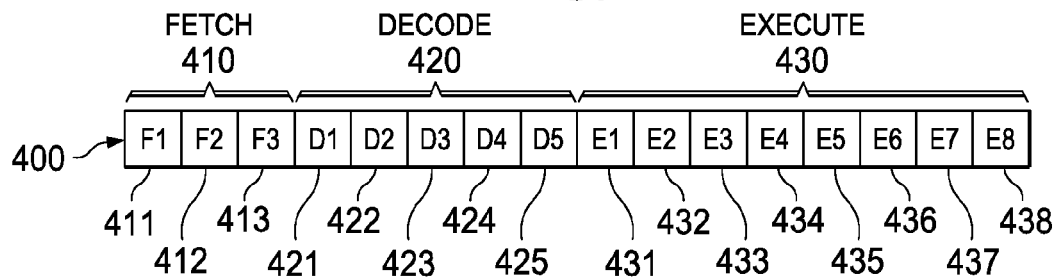
FIG. 4 illustrates the pipeline stages of the data processor illustrated in FIG. 1.

FIG. 4 illustrates the pipeline stages 400 of data processor 100. These pipeline stages are divided into three groups: fetch group 410; decode group 420; and execute group 430. All instructions in the instruction set flow through the fetch, decode, and execute stages of the pipeline. Fetch group 410 has three phases for all instructions, and decode group 420 has five phases for all instructions. Execute group 430 requires a varying number of phases depending on the type of instruction.

The fetch phases of the fetch group 410 are: program address send phase 411 (PS); bank number decode phase 412 (BN); and program fetch packet return stage 413 (PR). Data processor 100 can fetch a fetch packet (FP) of eight instructions per cycle per cluster. All eight instructions for a cluster proceed through fetch group 410 together. During PS phase 411, the program address is sent to memory. During BN phase 413, the bank number is decoded and the program memory address is applied to the selected bank. Finally during PR phase 413, the fetch packet is received at the cluster.

The decode phases of decode group 420 are: decode phase D1 421; decode phase D2 422; decode phase D3 423; decode phase D4 424; and decode phase D5 425. Decode phase D1 421 determines valid instructions in the fetch packet for that cycle by parsing the instruction P bits. Execute packets consist of one or more instructions which are coded via the P bit to execute in parallel. This will be further explained below. Decode phase D2 422 sorts the instructions by their destination functional units. Decode phase D3 423 sends the predecoded instructions to the destination functional units. Decode phase D3 423 also inserts NOPS if these is no instruction for the current cycle. Decode phases D4 424 and D5 425 decode the instruction at the functional unit prior to execute phase E1 431.

The execute phases of the execute group 430 are: execute phase E1 431; execute phase E2 432; execute phase E3 433; execute phase E4 434; execute phase E5 435; execute phase E6 436; execute phase E7 437; and execute phase E8 438. Different types of instructions require different numbers of these phases to complete. Most basic arithmetic instructions such as 8, 16 or 32 bit adds and logical or shift operations complete during execute phase E1 431. Extended precision arithmetic such as 64 bits arithmetic complete during execute phase E2 432. Basic multiply operations and finite field operations complete during execute phase E3 433. Local load and store operations complete during execute phase E4 434. Advanced multiply operations complete during execute phase E6 436. Global loads and stores complete during execute phase E7 437. Branch operations complete during execute phase E8 438.

Figure 5:
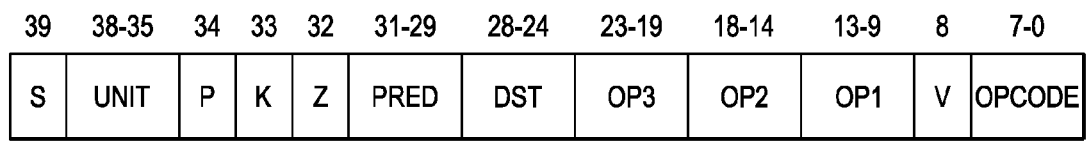
FIG. 5 illustrates a first instruction syntax of the data processor illustrated in FIG. 1.

FIG. 5 illustrates an example of the instruction coding of instructions used by data processor 100. This instruction coding is generally used for most operations except moves. Data processor 100 uses a 40-bit instruction. Each instruction controls the operation of one of the functional units. The bit fields are defined as follows.

The S bit (bit 39) designates the cluster left or right side. If S=0, then the left side is selected. This limits the functional unit to sub-clusters 111, 113, 115, 121, 123, 125, 131, 133, 135, 141, 143 and 145. If S=1, then the right side is selected. This limits the functional unit to sub-clusters 112, 114, 116, 122, 124, 126, 132, 134, 136, 142, 144 and 146.

The unit vector field (bits 38 to 35) designates the functional unit to which the instruction is directed. Table 3 shows the coding for this field.

TABLE 3

| Vector | I Slot | Functional Unit |
|---|---|---|
| 00000 | DLM | Data left main unit |
| 00001 | DLS | Data left secondary unit |
| 00010 | DLTm | Global left memory access |
| 00011 | DLTp | Data left transport primary |
| 00100 | DLTs | Data left transport secondary |
| 00101 | ALM | A math left main unit |
| 00110 | ALS | A math main left secondary unit |
| 00111 | ALTm | A math local left memory access |
| 01000 | ALTp | A math left transport primary |
| 01001 | ALTs | A math left transport secondary |
| 01010 | MLM | M math left main unit |
| 01011 | MLS | M math left secondary unit |
| 01100 | MLTm | M math local left memory access |
| 01101 | MLTp | M math left transport primary |

TABLE 3-continued

| Vector | I Slot | Functional Unit |
|---|---|---|
| 01110 | MLTs | M math left transport secondary |
| 01111 | C | Control Slot for left side |
| 10000 | DRM | Data right main unit |
| 10001 | DRS | Data right secondary unit |
| 10010 | DRTm | Global right memory access |
| 10011 | DRTp | Data right transport primary |
| 10100 | DRTs | Data right transport secondary |
| 10101 | ARM | A math right main unit |
| 10110 | ARS | A math main right secondary unit |
| 10111 | ARTm | A math local right memory access |
| 11000 | ARTp | A math right transport primary |
| 11001 | ARTs | A math right transport secondary |
| 11010 | MRM | M math right main unit | ister hard coded to all 1. This eighth register can be specified to make the instruction unconditional as its state is always known. As indicated above, the sense of the predication decision is set the state of the Z bit. The 7 writable predicate registers are controlled by a set of special compare instructions. Each predicate register is 16 bits. The compare instructions compare two registers and generate a true/false indicator of an instruction specified compare operation. These compare operations include: less than; greater than; less than or equal to; greater than or equal to; and equal to. These compare operations specify a word size and granularity. These include scalar compares which operate on the whole operand data and vector compares operating on sections of 64 bits, 32 bits, 16 bits and 8 bits. The 16-bit size of the predicate registers permits storing 16 SIMD compares for 8-bit data packed in 128-bit operands. Table 4 shows example compare results and the predicate register data loaded for various combinations.

TABLE 4

| Type | Compare Results | Stored in Predicate Register |
|---|---|---|
| 1H scalar | 0x00000000:0000FFFF | 1111111111111111 |
| 4H vector | 0x0000FFFF:0000FFFF | 0000000000110011 |
| 8H vector | 0x0000FFFF:0000FFFF:0000FFFF:0000FFFF | 0001101100110011 |
| 1W scalar | 0x00000000:FFFFFFFF | 1111111111111111 |
| 2W vector | 0x00000000:FFFFFFFF | 0000000000001111 |
| 4W vector | 0x00000000:FFFFFFFF:00000000:FFFFFFFF | 0000111100001111 |
| 1D scalar | 0xFFFFFFFF:FFFFFFFF | 1111111111111111 |
| 2D vector | 0xFFFFFFFF:FFFFFFFF:00000000:00000000 | 1111111100000000 |
| 8B vector | 0x00FF00FF:00FF00FF | 0000000001010101 |
| 16B vector | 0x00FF00FF:00FF00FF:00FF00FF:00FF00FF | 0101010101010101 |

TABLE 3-continued

| Vector | I Slot | Functional Unit |
|---|---|---|
| 11011 | MRS | M math right secondary unit |
| 11100 | MRTm | M math local right memory access |
| 11101 | MRTp | M math right transport primary |
| 11110 | MRTs | M math right transport secondary |
| 11111 | C | Control Slot for right side |

The P bit (bit 34) marks the execute packets. The p-bit determines whether the instruction executes in parallel with the following instruction. The P bits are scanned from lower to higher address. If P=1 for the current instruction, then the next instruction executes in parallel with the current instruction. If P=0 for the current instruction, then the next instruction executes in the cycle after the current instruction. All instructions executing in parallel constitute an execute packet. An execute packet can contain up to eight instructions. Each instruction in an execute packet must use a different functional unit.

The K bit (bit 33) controls whether the functional unit result is written into the destination register in the corresponding register file. If K=0, the result is not written into the destination register. This result is held only in the corresponding forwarding register. If K=1, the result is written into the destination register.

The Z field (bit 32) controls the sense of predicated operation. If Z=1, then predicated operation is normal. If Z=0, then the sense of predicated operation control is inverted.

The Pred field (bits 31 to 29) holds a predicate register number. Each instruction is conditional upon the state of the designated predicate register. Each sub-cluster has its own predication register file. Each predicate register file contains 7 registers with writable variable contents and an eight reg- The DST field (bits 28 to 24) specifies one of the 24 registers in the corresponding register file or a control register as the destination of the instruction results.

The OPT3 field (bits 23 to 19) specifies one of the 24 registers in the corresponding register file or a 5-bit constant as the third source operand.

The OPT2 field (bits 18 to 14) specifies one of the 24 registers in the corresponding register file or a 5-bit constant as the second source operand.

The OPT1 field (bits 13 to 9) specifies one of the 24 registers of the corresponding register file or a control register as the first operand.

The V bit (bit 8) indicates whether the instruction is a vector (SIMD) predicated instruction. This will be further explained below.

The opcode field (bits 7 to 0) specifies the type of instruction and designates appropriate instruction options. A detailed explanation of this field is beyond the scope of this invention except for the instruction options detailed below.

Figure 6:
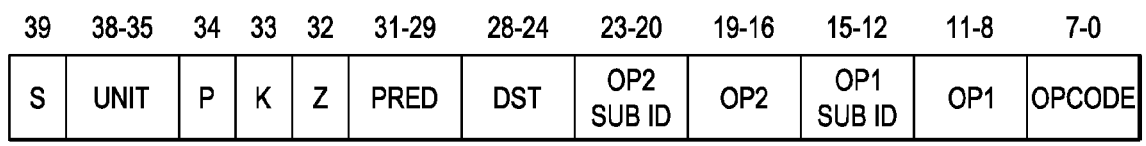
FIG. 6 illustrates a second instruction syntax of the data processor illustrated in FIG. 1.

FIG. 6 illustrates a second instruction coding generally used for data move operations. These move operations permit data movement between sub-clusters within a cluster and also between sub-clusters of differing clusters. This second instruction type is the same as the first instruction type illustrated in FIG. 5 except for the operand specifications. The three 5-bit operand fields and the V bit are re-arranged into four 4-bit operand fields. The 0P2 sub-cluster ID field (bits 23 to 20) specifies the identity of another cluster as the source of a second operand. The 0P2 field (bits 19 to 16) specifies a register number for the second operand. The OP1 sub-cluster ID field (bits 15 to 12) specifies the identity of another cluster as the source of a first operand. The OP1 field (bits 11 to 8) specifies a register number for the first operand. All other fields are coded identically to corresponding fields described in conjunction with FIG. 5.

Data processor 100 includes 4 clusters 110, 120, 130 and 140 which are further subdivided into sub-clusters. To minimize the size of the central register file, each sub-cluster has its own register file and sub-clusters are connected together via a transport switch. There are no storage elements within a transport switch, these are purely a way to move get data between sub-cluster register files. There are two move networks on the cluster the primary network and the secondary network. Both a primary and a secondary move may execute on each sub-cluster every cycle. Each global register L and R for that cluster has a read port on both the primary and secondary networks.

Each sub-cluster register file has two read and two write ports for data transport use. This allows up to 12 transfer switch move instructions to be performed in parallel on each cluster.

Multiple move operations can occur from the same register file as long as the source register number is the same. All 6 move instructions on the primary network or all 6 on the secondary network could read a single register in a single sub-cluster and broadcast this value anywhere in the cluster. Only one write can be used for an intra-cluster move so multiple moves to the same register file can't occur on the same network. These data moves must be serialized. There are 5 types of intra-cluster moves and 3 types of inter-cluster moves noted in Table 2.

Figure 7:
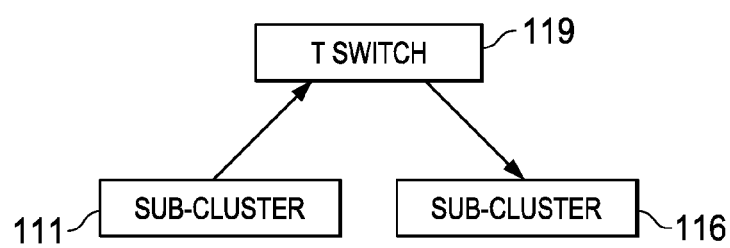
FIG. 7 schematically illustrates an example of intra-cluster communication.

FIG. 7 illustrates an example intra-cluster move. Sub-cluster 111 supplies data to transport switch 119 which supplies the data to sub-cluster 116. This data move requires only one operational cycle. As shown by the connections noted in FIG. 3, this intra-cluster move could take place via either the primary network 310 or the secondary network 320.

Moving data between clusters requires a 2 stage process. Data first moves into a global register file. Due to the physical distance across data processing apparatus 100 this move requires 2 cycles in the current embodiment. Future embodiments might require more cycles for scalability. A second move transfers the data from the global register file into the local register file in the destination sub-cluster. This second move requires a minimum of one cycle.

The global register files of the preferred embodiment each contain 16 64-bit registers or 8 128-bit register pairs. The sub-cluster register files preferably each contain 24 registers. The global register files can be written to all at the same time using a global instruction. However they can also be written to locally in a single via a local move without the global write taking place.

Figure 8:
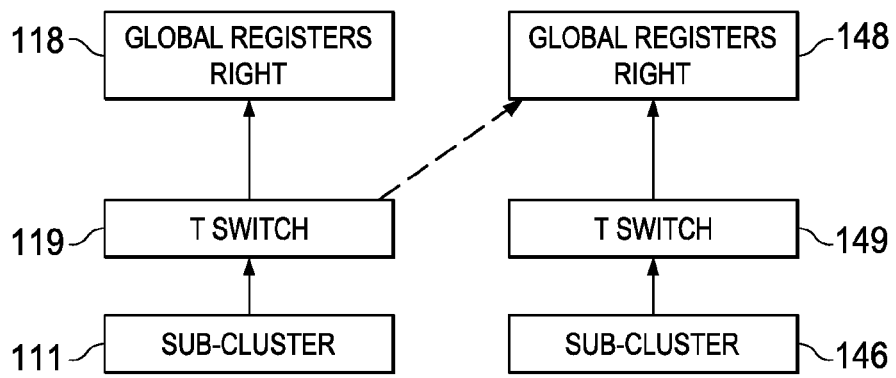
FIG. 8 schematically illustrates an example of inter-cluster communication.

FIG. 8 illustrates a move between sub-clusters of different clusters. Sub-cluster 111 supplies data to transport switch 118, which further transports the data to global register file right 118. This data move requires a global move instruction. A local physical copy of each global register file is kept in each cluster. The allows the architecture to maintain scalability for various numbers of clusters. Thus global register file right 118, 128, 138 and 148 store the same data. A global move instruction thus supplies data to all the corresponding side register files. This is shown via a dashed line in FIG. 8. In the second stage of the inter-cluster move example of FIG. 8, global register file right 148 supplies data to transport switch 149 which forwards it to sub-cluster 146.

The global register files are connected to the primary and secondary transport networks. The global register files each have a primary and secondary read port and they can be written by either the primary or the secondary networks but not both at the same time. A total of 2 of these local to global moves can occur per cluster per cycle. Such global to local transfers to or from a sub-cluster register file cannot occur at the same time as an intra-cluster to or from the same sub-cluster. A global move occurs prevents a normal move from that sub-cluster read port. Write ports are similarly restricted.

This local and global data move technique allows a scalable and hierarchical design. This design assumes that in most algorithms operations tend to communicate with their nearest neighbors more often than with distant neighbors. Thus communication between 2 operations is unlimited inside a sub-cluster, is bounded to allow 12 intra-clusters moves per cluster and is further bounded to allow 4 inter-cluster moves which each require two operations.

The data transports executing in transport switch use permute control to re-arrange data as it is moved. This overcomes the limitations of SIMD parallelism which assumes the data is only ever running in parallel threads. Since data inevitably must be rearranged, doing so during the inter-sub-cluster moves is convenient.

Moves employing transport switches must access a permute control register file 330 (FIG. 3). The instruction provides an index to select one of the permute control registers. In the preferred embodiment there are 8 permute control registers. Permute control register 0 is hard-coded to pass data through without permuting. This is the most common case. The other permute control register are writable to set up a particular permute type. The permute control registers are written to via a write control register instruction in advance of use to control permute during a move. The permute occurs before the data is written to the register file. In the preferred embodiment each permute register includes 8 4-bit fields defining 0 to 15 16-bit locations. The permute control registers are shared between the primary network 310 and the secondary network 320.

For normal 64-bit moves, each permute register forms an 8 by 8 matrix of single bit elements. The 64-bit source and destinations are divided into 8-bit sections. A 1 in a row of the permute register indicates that the corresponding column element of the source is placed in the corresponding section of the destination. Only a single 1 can be in any row of the permute register matrix. This technique enables any source section to be placed in any destination. This permits source sections to be repeated in the destination, such as duplicating a source section in all the destination sections.

Figure 9:
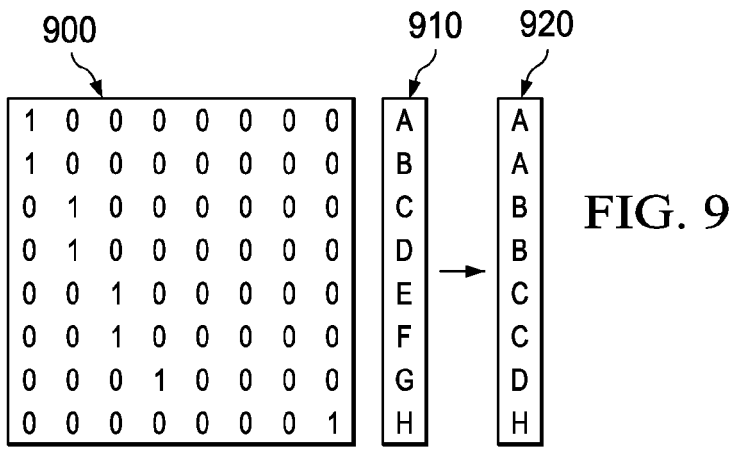
FIG. 9 illustrates a single register to single register permute.

FIG. 9 illustrates an example of this permutation. The instruction selected permute register forms matrix 900. The input data forms vector 910. Vector 910 includes 8 sections designated A, B, C, D, E, F, G and H. Multiplication of matrix 900 by vector 910 forms vector 920, which is the destination data. Note that sections A, B and C of vector 910 repeat in vector 920 and the sections E, F and G do not appear in vector 920. The data of the permute register in effect controls 8 multiplexers, one for each destination section. Each row of the permute matrix selects one source section to be supplied via a matrix to a corresponding destination section.

Since each row can have only a single 1, the row of 8 elements can be completely specified by 3 bits. This compresses the amount of data needed to specify the permute operation. A translation table converts the 3 bits per row into the multiplexer control signals needed to produce the desired permute output. The controls for this switch operation are preset into 8 possible switch combinations, 0×0, 0×1, 0×2, 0×3, 0×4, 0×5, 0×6 and 0×7. In the preferred embodiment the permute register is configured by setting the three least significant bits of 8 4-bit registers Hword0, Hword1, Hword2, Hword3, Hword4, Hword5, Hword6 and Hword7.

Figure 10:
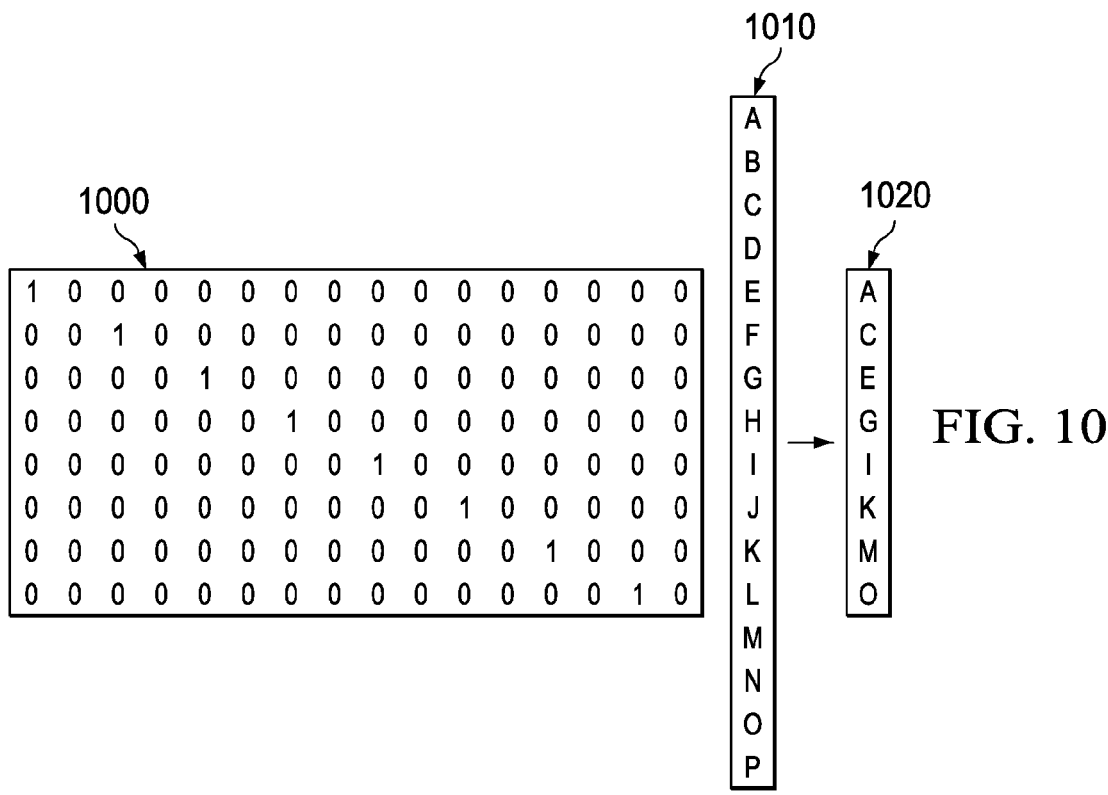
FIG. 10 illustrates a register pair to single register permute.

Data processor 100 preferably also supports move operations which select 8 8-bit sections from a register pair (128 bits). Accordingly to the analogy of FIG. 9, this requires a 16 by 8 element matrix specified by the permute register. FIG. 10 illustrates an example of the matrix view of this operation. The 16 by 8 matrix 1000 is multiplied by 16 element vector 1010. The resultant is 16 element vector 1020. Each 16 element row can be represented by the 16 states of 4 bits. In the preferred embodiment the permute register is configured by setting the all 4 bits of 8 4-bit registers Hword0, Hword1, Hword2, Hword3, Hword4, Hword5, Hword6 and Hword7.

Figure 11:
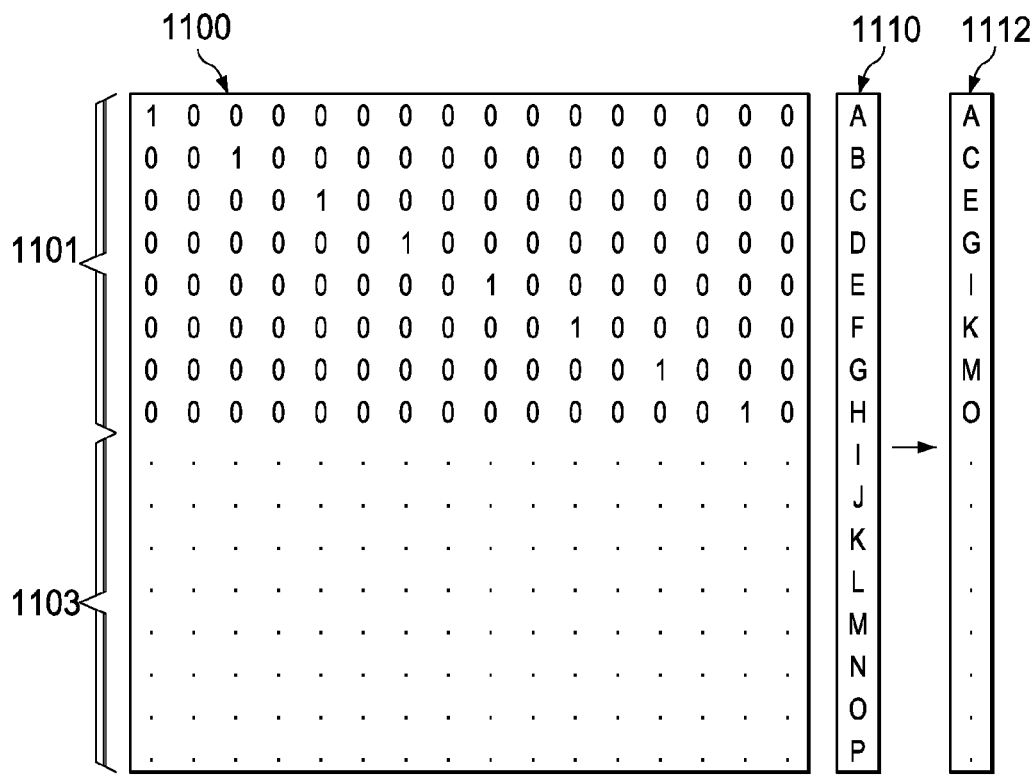
FIG. 11 illustrates a register pair to register pair permute showing sections of explicit and implicit control.
Figure 12:
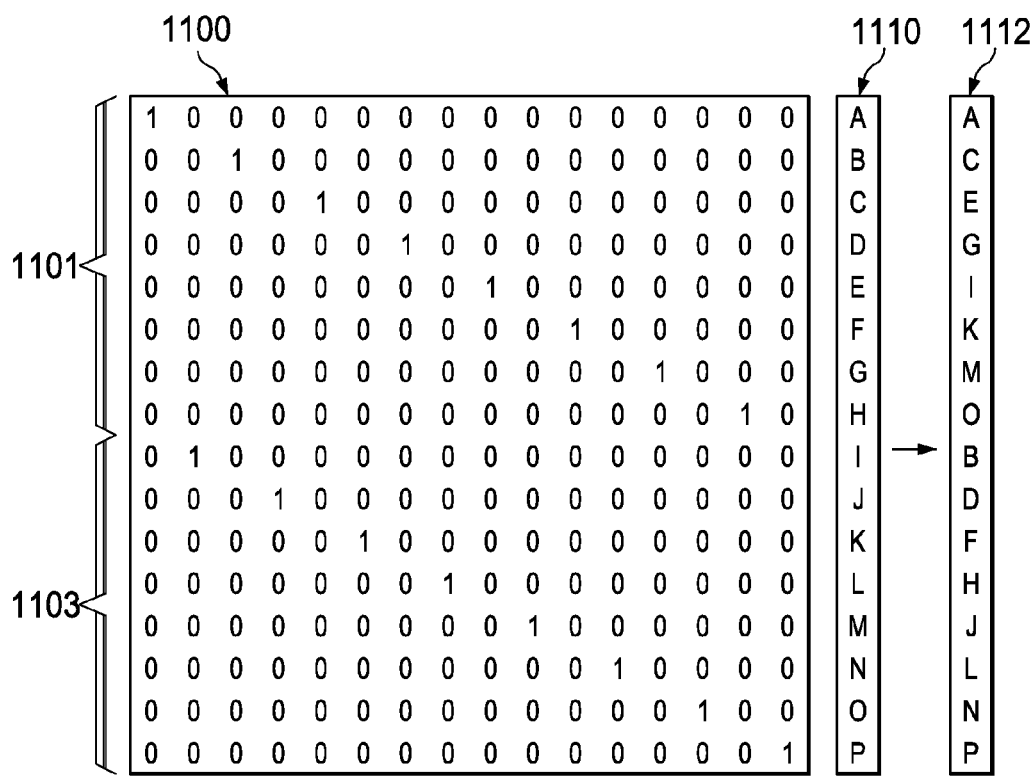
FIG. 12 illustrates the permute of FIG. 11 showing the generation of implicit control.

Data processor 100 preferably also supports move operations which select 16 8-bit sections (128 bits) from a register pair (128 bits). Accordingly to the analogy of FIG. 9, this requires a 16 by 16 element matrix specified by the permute register. This number of matrix elements cannot be expressed by the 32-bit (8 by 4-bit data words) of the preferred embodiment. FIG. 11 illustrates an example of the matrix view of this operation. FIG. 11 shows matrix 1100 includes top section 1101 specified by the 32 bits of permute register data as described above. The bottom section 1103 is implemented by hardware. Bottom section 1103 is a 180 degree rotation of the top section 1101 specified by the user. FIG. 12 illustrates this example with the bottom section 1103 completed by the hardware. Thus register pair operand 1110 is permuted into register pair 1120 result. Several transformations are possible including matrix transpose. This coding is not adequate to describe all possible cases, such as matrix rotate. However the most common transformations can be executed in one data move controlled by the permute register.

What is claimed is:

1. A data processor comprising:
a plurality of operational clusters, each operational cluster including
a plurality of sub-clusters, each sub-cluster including a local register file including a plurality of local data registers storing data, a plurality of functional elements operable to perform instruction specified data operations on instruction specified operand data registers and store resultant data in an instruction specified destination data register,
a transport switch connected to each sub-cluster operable to transfer data from an instruction specified source data register in a first instruction specified sub-cluster to an instruction specified destination data register in a second instruction specified sub-cluster;
a global data register file including a plurality of global data registers storing data, said global data register file connected to said transport switch in each of said sub-clusters; and
said transport switch of each sub-cluster further operable to transfer data from an instruction specified source data register in an instruction specified sub-cluster of said cluster to an instruction specified destination data register in said global data register file, and
transfer data from an instruction specified destination data register in said global data register file to an instruction specified sub-cluster of said cluster; and
said transport switch of each sub-cluster includes a plurality of permute registers, each specifying a permute of transferred data; and
said transport switch of each sub-cluster is further operable to permute transferred data according to an instruction specified one of said plurality of permute registers.

2. The data processor of claim 1, wherein:
said plurality of permute registers includes one read-only permute register specifying a pass-through data transfer and at least one read/write permute register.

3. A data processor comprising:
a plurality of operational clusters, each operational cluster including
a plurality of sub-clusters, each sub-cluster including a local register file including a plurality of local data registers storing data, a plurality of functional elements operable to perform instruction specified data operations on instruction specified operand data registers and store resultant data in an instruction specified destination data register,
a transport switch connected to each sub-cluster operable to transfer data from an instruction specified source data register in a first instruction specified sub-cluster to an instruction specified destination data register in a second instruction specified sub-cluster;
a global data register file including a plurality of global data registers storing data, said global data register file connected to said transport switch in each of said sub-clusters; and
said transport switch of each sub-cluster further operable to transfer data from an instruction specified source data register in an instruction specified sub-cluster of said cluster to an instruction specified destination data register in said global data register file, and
transfer data from an instruction specified destination data register in said global data register file to an instruction specified sub-cluster of said cluster; and
said transport switch of each sub-cluster includes at least one permute register specifying a permute of transferred data, said at least one permute register specifies a selected one section of said instruction specified source data register coupled to each section of said instruction specified destination data register.

4. The data processor of claim 3, wherein:
said instruction specified source data register and said instruction specified destination data register are each divided into 8 sections; and
said permute register includes 3 bits for each section of said instruction specified destination data register specifying the coupled section of said instruction specified source data register.

5. The data processor of claim 3, wherein:
said instruction specified source data register is divided into 16 sections; and
said instruction specified destination data register is divided into 8 sections; and
said permute register includes 4 bits for each section of said instruction specified destination data register specifying the coupled section of said instruction specified source data register.

6. The data processor of claim 3, wherein:
said instruction specified source data register and said instruction specified destination data register are each divided into 16 sections;
said permute register includes 4 bits for each top half section of said instruction specified destination data register specifying the coupled section of said instruction specified source data register; and
said transfer switch supplies 4 bits for each bottom half section of said instruction specified destination data register specifying the coupled section of said instruction specified source data register.

* * * * *